Sept. 15, 1964 H. E. TRUMBULL 3,148,601

XEROGRAPHIC REPRODUCING APPARATUS

Filed Dec. 23, 1960 5 Sheets-Sheet 1

*INVENTOR.*
HAROLD E. TRUMBULL

BY [signature]

*ATTORNEY*

Sept. 15, 1964 H. E. TRUMBULL 3,148,601

XEROGRAPHIC REPRODUCING APPARATUS

Filed Dec. 23, 1960 5 Sheets-Sheet 2

INVENTOR.
HAROLD E. TRUMBULL
BY [signature]
ATTORNEY

XEROGRAPHIC REPRODUCING APPARATUS

Filed Dec. 23, 1960 5 Sheets-Sheet 3

INVENTOR.
HAROLD E. TRUMBULL

BY Norman P. Schroder

ATTORNEY

XEROGRAPHIC REPRODUCING APPARATUS

Filed Dec. 23, 1960

INVENTOR.
HAROLD E. TRUMBULL
BY [signature]
ATTORNEY

INVENTOR.
HAROLD E. TRUMBULL
BY [signature]
ATTORNEY

United States Patent Office 3,148,601

Patented Sept. 15, 1964

3,148,601

XEROGRAPHIC REPRODUCING APPARATUS

Harold E. Trumbull, Columbus, Ohio, assignor, by mesne assignments, to Xerox Corporation, a corporation of New York Filed Dec. 23, 1960, Ser. No. 85,948
3 Claims. (Cl. 95—1.7)

This invention relates in general to xerography and, in particular, to an improved xerographic reproducing apparatus.

More specifically, the invention relates to improved automatic xerographic apparatus for use in producing xerographic reproductions from a moving original.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electroscopic powder, hereinafter referred to as toner, and a granular carrier material, which later functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into surface contact with the coating on the xerographic plate and is held thereon electrostatically in a pattern corresponding to the electrostatic latent image. Thereafter, the developed xerographic image is usually transferred to a support or transfer material to which it may be fixed by any suitable means.

Since the disclosure of the basic concept of xerography by Carlson, a variety of machines and devices have been proposed to incorporate such teachings in a manner to form copy xerographically on a commercial basis. For the most part, each of such devices has been specifically designed to the solution of a particular reproduction problem and, for the most part, has been limited to the particular use intended.

It is, therefore, the principal object of this invention to improve xerographic reproduction apparatus for general copying applications of the type normally encountered in business, engineering or law offices, the xerographic apparatus being capable of making copies quickly, automatically, economically and accurately.

Another object of this invention is to improve upon xerographic apparatus so that reproductions of a moving copy or document can be made automatically.

For a better understanding of the invention as well as other objects and further features thereof, reference is had to the following detailed description of the invention to be read in connection with the accompanying drawings, wherein.

Figure 1:
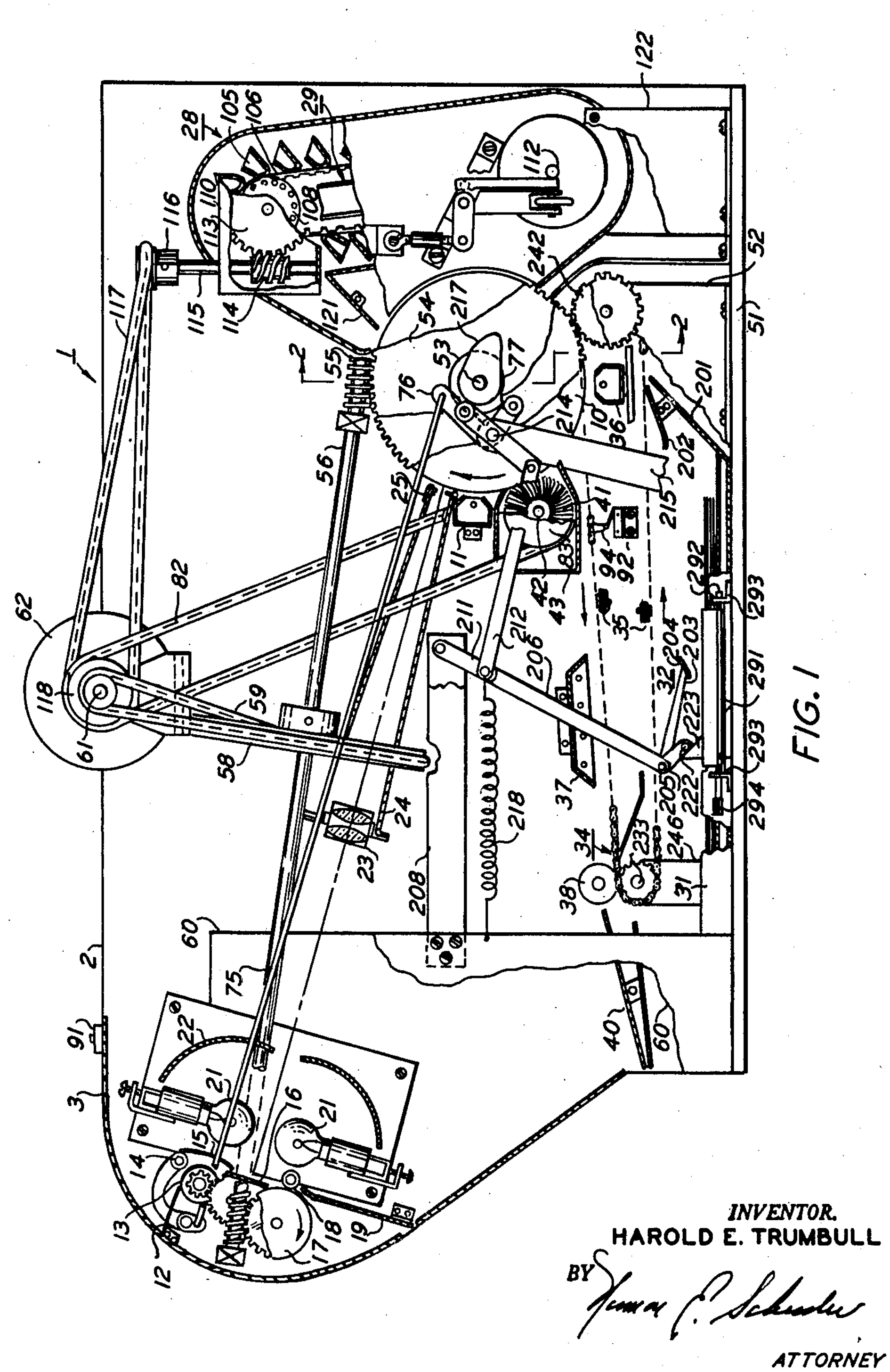
FIG. 1 illustrates, with the right-hand cover removed and parts broken away, a preferred embodiment of a xerographic reproducing apparatus adapted for continuous and automatic operation.

Referring now to the drawings, there is shown, a desk top xerographic reproducing machine used for producing xerographic reproductions from a moving original. The xerographic apparatus of the invention is adapted for installation in a suitable, essentially light-tight enclosure or cabinet.

The enclosure, generally designated 1, constructed in a conventional manner, includes a left-hand side plate 2, a right-hand side plate (not shown) and a top cover plate 3 which also extends over the ends of the machine. The top cover plate is provided with a suitable ingress opening for copy, and openings are provided through which the copy and the reproduction can be discharged from the machine, such as paper or the like, can be inserted.

As shown in FIG. 1, the xerographic apparatus comprises a xerographic plate including a photoconductive layer or light-receiving surface on a conductive backing and formed in the shape of a drum, generally designated by numeral 10, which is journaled to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum; an exposure station, at which a light or radiation pattern of copy to be reproduced is projected onto the drum surface to dissipate the drum charge in the exposed areas thereof and thereby form a latent electrostatic image of the copy to be reproduced;

A development station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and A drum cleaning and discharge station, at which the drum surface is first charged and then brushed to remove residual toner particles remaining thereon after image transfer, and at which the drum surface is exposed to a relatively bright light source to effect substantially complete discharge of any residual electrostatic charge remaining thereon.

In general, the charging apparatus or corona charging device 11 includes a corona discharge array of one or more discharge electrodes that extend transversely across the drum surface and are energized from a high potential source and are substantially enclosed within a shielding member.

Next subsequent thereto in the path of motion of the xerographic drum is an exposure station. This exposure station may be one of a number of types of mechanisms or members such as desirably an optical scanning or projection system or the like designed to project a line copy image onto the surface of the photoconductive xerographic drum from a suitable original.

In the embodiment shown, documents to be reproduced are fed in turn manually on the document receiving guide 12 between driven feed roller 13 and idler roller 14 which is periodically biased into frictional contact with feed roller 13 or the document sandwiched therebetween. When in feeding relation to each other, these rollers advance the document along guide 15 then across the illuminated gate 16 into the bite of document feed out rollers 17 and 18 which feed it along guide 19 to be discharged from the machine.

The document is illuminated by lamps 21 connected to a suitable source of power and mounted in front of light reflectors 22. A lens 23 is mounted in the light path from the slotted light reflector to focus a flowing image into the xerographic drum.

A light shield 24 adapted to protect the xerographic drum from extraneous light and to support the lens is positioned adjacent the drum surface. A slot aperture 25 in the light shield extends transversely to the path of movement of the light receiving surface of the drum to permit reflected rays from the document focused by the lens secured to the end of the light shield to be directed against a limited transverse area of the light-receiving surface as it moves past the slot aperture.

Adjacent to the exposure station is a developing station C in which there is positioned a developer apparatus 28 including a developer housing having a lower or sump portion for accumulating developer material. Mounted within the developer housing is a driven bucket-type conveyor used to carry the developer material previously supplied to the developer housing to the upper portion of the developer housing from where the developer material is cascaded over a hopper chute onto the drum.

As the developer material cascades over the drum, toner particles of the developer material adhere electrostatically to the previously formed electrostatic latent image areas on the drum to form a visible xerographic powder image; the remaining developer material falling off the peripheral surface of the drum into the bottom of the developer housing. Toner particles consumed during the developing operation to form the xerographic powder images are replenished by a toner dispenser 29, of the type disclosed in copending Hunt application, Serial No. 776,976, filed November 28, 1958, now Patent No. 3,013,703, mounted within the developer housing.

Positioned next adjacent to the developing station is the image transfer station which includes suitable sheet feeding mechanism adapted to feed sheets of paper successively to the xerographic drum in coordination with the presentation of the developed image on the drum at the transfer station. The sheet feeding mechanism includes a sheet source such as tray 31 for a plurality of sheets of a suitable support material, that is, sheets of paper or the like, separating means 32 adapted to feed the top sheet of the stack of support material to a sheet conveyor mechanism 34 having paper grippers 35 thereon which carry the sheet support material into contact with the rotating xerographic drum in coordination with the appearance of a developed image at the transfer station.

The transfer of the xerographic powder image from the drum surface to the support material is effected by means of a corona transfer device 36 that is located at or immediately after the point of contact between the support material and the rotating xerographic drum. The corona transfer device 36 is substantially similar to the corona discharge device that is employed at the charging station in that it also includes an array of one or more corona discharge electrodes that are energized from a suitable high potential source and extend transversely across the drum surface and are substantially enclosed within a shielding member. In operation, the electrostatic field created by the corona transfer device is effective to tack the transfer material electrostatically to the drum surface and simultaneously with the tacking action, the electrostatic field is effective to attract the toner particles comprising the xerographic powder image from the drum surface and cause them to adhere electrostatically to the surface of the support material.

As the paper gripper mechanism continues to move forward in its closed circuit, it will strip the support material from the xerographic drum and carry it to a fixing device, such as, for example, heat fuser 37, whereat the developed and transferred xerographic powder image on the support material is permanently fixed thereto, the trailing edge of the support material being supported by guide 88 suitably mounted to extend between the chains of the sheet conveyor.

After fusing, the finished copy is preferably discharged from the apparatus at a suitable point for collection externally of the apparatus. To accomplish this there is provided a pair of delivery rolls 38 and 39 by means of which the copy is discharged from the machine through guide 40 after it is released by the gripper mechanism. Suitable cam means are provided at the receiving and delivery stations of the conveyor mechanism to actuate the paper gripper at these stations to receive or discharge a sheet of support material.

The next and final station in the device is a drum cleaning station whereat any powder remaining on the xerographic drum after the transfer step is removed.

To remove any residual powder remaining on the drum there is provided a brush 41 of such construction as to apply extremely light pressure to the surface of the drum to dislodge any powder particles that may adhere thereto. The brush is mounted on shaft 42 journaled within dust hood 43 that is formed to encompass approximately two-thirds of the brush area.

Figures 2, 3:
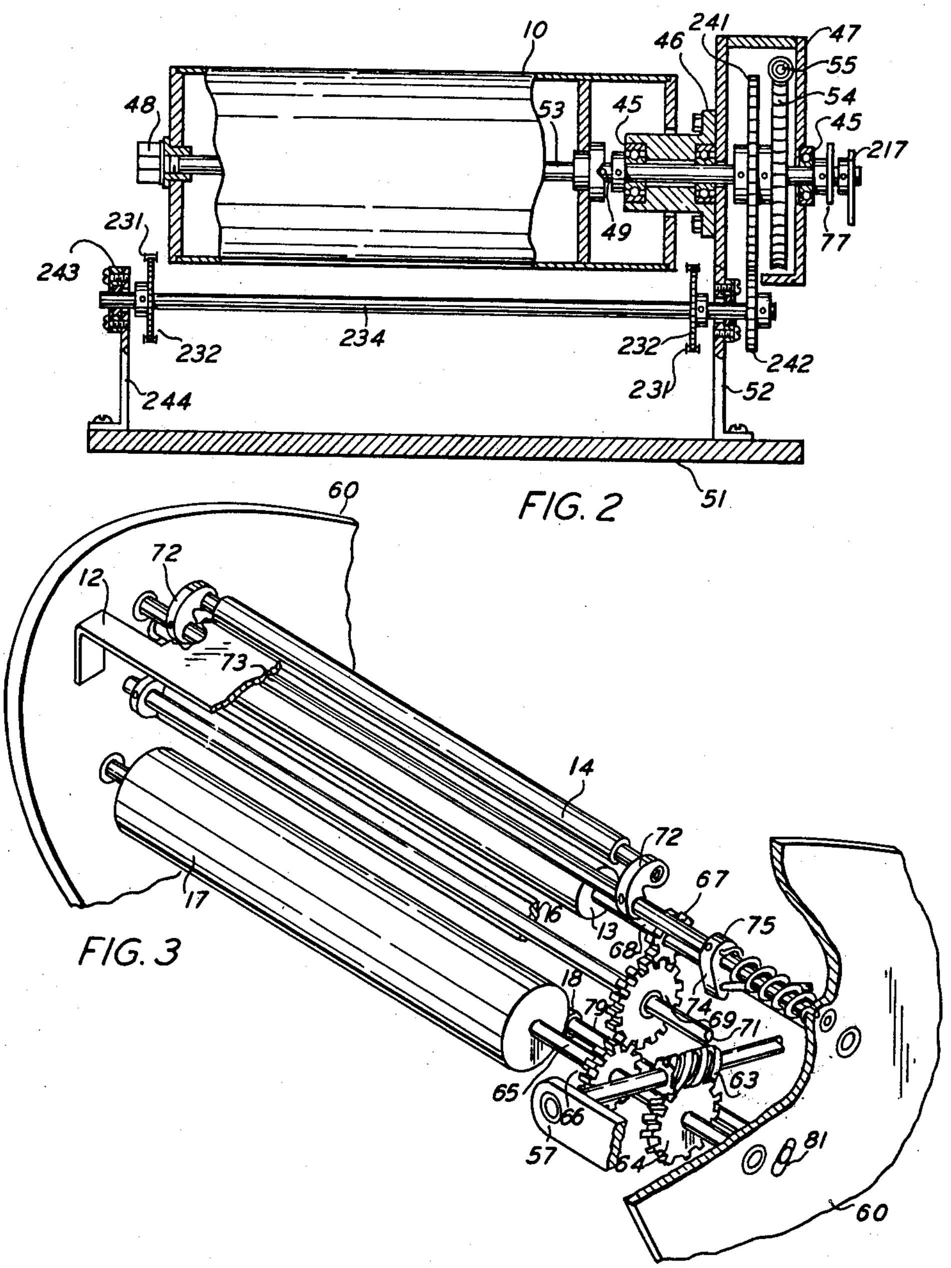
FIG. 2 is a sectional view taken along line 2—2 of FIG. 1.
FIG. 3 is a right-hand perspective view of the front of the machine with parts of the frame broken away to show the document feed mechanism of the apparatus.
Figure 7:
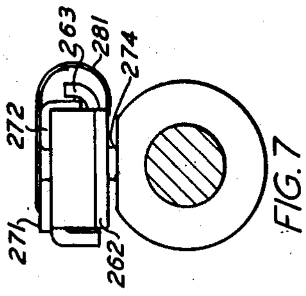
FIGS. 7, 7A and 7B are sectional views of the paper gripper in closed position, taken along the lines 7—7, 7A—7A, and 7B—7B, respectively, of FIG. 6.
Figure 7A:
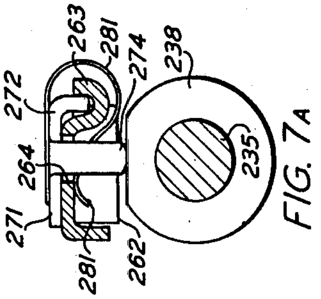
Figure 7B:
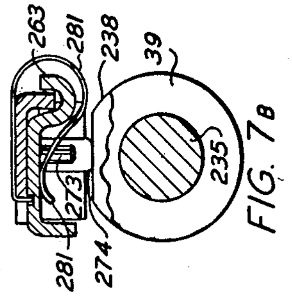

As shown in FIGS. 1 and 2, the drum 10 is mounted on horizontal driven shaft 53 and the drum is positioned on the left-hand side of the machine, viewed from the front, with the xerographic components of the machine mounted around the drum.

Shaft 53 rotates in bearings 45 mounted in the flanged bearing housing 46 secured to frame plate 52 attached to base plate 51 and in the gear housing 47 attached to frame plate 52. The free end or left-hand end of the shaft 53 is threaded to receive thumb nut 48 by means of which the notched hub of the xerographic drum is forced into driven engagement with the pin 49 fixed on the shaft.

A compound gear, including worm gear 54 and pinion gear 242 is secured to shaft 53 between the right-hand face of frame plate 52 and the gear housing 47. The worm gear 54 is driven by worm 55 attached to one end of main drive shaft 56 which also carries at its opposite end a worm 63 to drive the document scanning mechanism described in detail hereinafter. The main drive shaft is suitably journaled in the gear housing 47 and in bearing support 57 fixed to the right-hand frame plate 60 supporting the document scanning mechanism. Main drive shaft 56 is connected operatively to the motor 62 by belt 59, which runs on pulleys 58 and 61 fixedly mounted on shaft 56 and on the end of the shaft of the motor 62 by belt 59, which runs on pulleys 58 and 61 fixedly mounted on shaft 56 and on the end of the shaft of the motor 62, respectively. The motor is connected to a source of electric power (not shown) and is controlled by switching means described hereinafter.

In general, the electrostatic charging of the xerographic drum is preparation for the exposure step and the electrostatic charging of the support surface to effect transfer are accomplished by means of corona generating devices whereby an electrostatic charge is applied to the respective surface. Although any one of a number of types of corona generating devices may be used, a corona generating device of the type disclosed in Vyverberg Patent 2,836,725 is used for both the corona charging device 11 and the corona transfer device 36, each of which is secured to a suitable frame element of the apparatus and connected to an electrical circuit, not shown.

The original or copy to be reproduced is inserted by the operator between a small pivoted start or idler roller 14 and the first driven roller 13. The operator must push the paper between the rolls until the original is restrained by guide 15. When the cycle is initiated, a cam 77 on the drum shaft causes the start or idler roller 14 to press the paper against the driven roller 13. The leading edge of the original is driven across the scanning area and enters the nips of the second set of rollers or feed out rollers 17 and 18. After the original enters the feed out roller the start or idler roller 14 raises and the trailing edge of the guide 15 comes in contact with the original to press it against gate 16 which acts as a backup plate.

The feed rollers of the document scanning mechanism are driven at a uniform speed to move a document to be scanned across the illuminated gate 16 in synchronism with the movement of the xerographic drum whereby a flowing image of the document is projected in proper registration upon the xerographic drum. To effect synchronous movement between the feed rollers and the xerographic drum, the same shaft used to drive the drum is also used to drive the rollers; that is, the shaft 56 is provided with a second worm 63 which engages the worm gear 64 fixed to the end of shaft 65 carrying the feed-out roller 17. Equal lineal speed of the document feed roller 13 and the feed-out roller 17 is effected by means of a gear 66 secured to shaft 65 which drives gear 67 fixed to the end of shaft 68 supporting the document feed roller 13 for rotation therewith, through idler gear 69 journaled on axle 71 fixed to the frame plates 60. Axle 71 has the gate 16 secured thereto.

Shaft 65 and 68 carrying feed-out roller 17 and document feed roller 13 are suitably journaled in parallel relation to each other in the frame plate 60 attached to base plate 51 at the front of the machine.

To intermittently effect feeding of a document to be scanned, the idler roller 14 is journaled in one end of arms 72 which are secured at their opposite ends to a document feed control shaft 73 journaled in the frame plate 60.

In order to resiliently bias the idler roller into engagement with the driven feed roller or a document sandwiched therebetween, a coil spring 78 encircles the right-hand end portion of document feed control shaft 73. One end portion of the coil spring engages the lever arm 74 and the opposite end portion is fixed to the right-hand frame plate 60.

The document feed control shaft is periodically oscillated to bring the idler roller 14 into or out of feeding contact with the feed roller 13 or a document sandwiched therebetween, by lever arm 74 connected by link 75 to the cam follower lever 76 having a follower 84 riding on cam 77 secured to the drum shaft 53. Cam follower lever 76 is pivotably secured intermediate its ends by a shoulder pin 214 to support 215.

As the cam follower 76 rises on the cam 77, the idler roller 14 is forced, against the biasing action of the coil spring 78, out of feeding contact with the driven feed roller 13, whereas on the fall of the cam follower, the coil spring will resiliently bias the idler roller into feeding contact with the driven feed roller.

Idler feed-out roller 18 is mounted on shaft 79 movably mounted in slots 81 formed at an angle of approximately 45 degrees from the vertical in the frame plate 60, whereby the feed-out roller 18 is forced by gravity into peripheral contact with the feed-out roller 17.

*Development System*

In order to effect development of the electrostatic latent image on the cylindrical xerographic plate, the developing system shown includes a developer apparatus 28 which coacts with the cylindrical xerographic plate or drum to form a development zone wherein the charged and exposed surface of the drum is developed to form a powder image of the copy.

For this purpose a developer housing is mounted adjacent to the xerographic drum to form the development zone. Mounted within the developer housing is a driven bucket-type conveyor used to carry the developer material previously supplied to the developer housing to the upper portion of the developer housing from where the developer material is cascaded over a hopper chute onto the drum. As the developer material cascades over the drum toner particles of the developer material adhere electrostatically to the previously formed electrostatic latent image areas on the drum, the remaining developer material falling off the peripheral surface of the drum into the bottom of the developer housing. Toner particles consumed during the development operation to form the visible powder images are replenished by a toner dispenser mounted within the developer housing.

Figures 4, 5, 8:
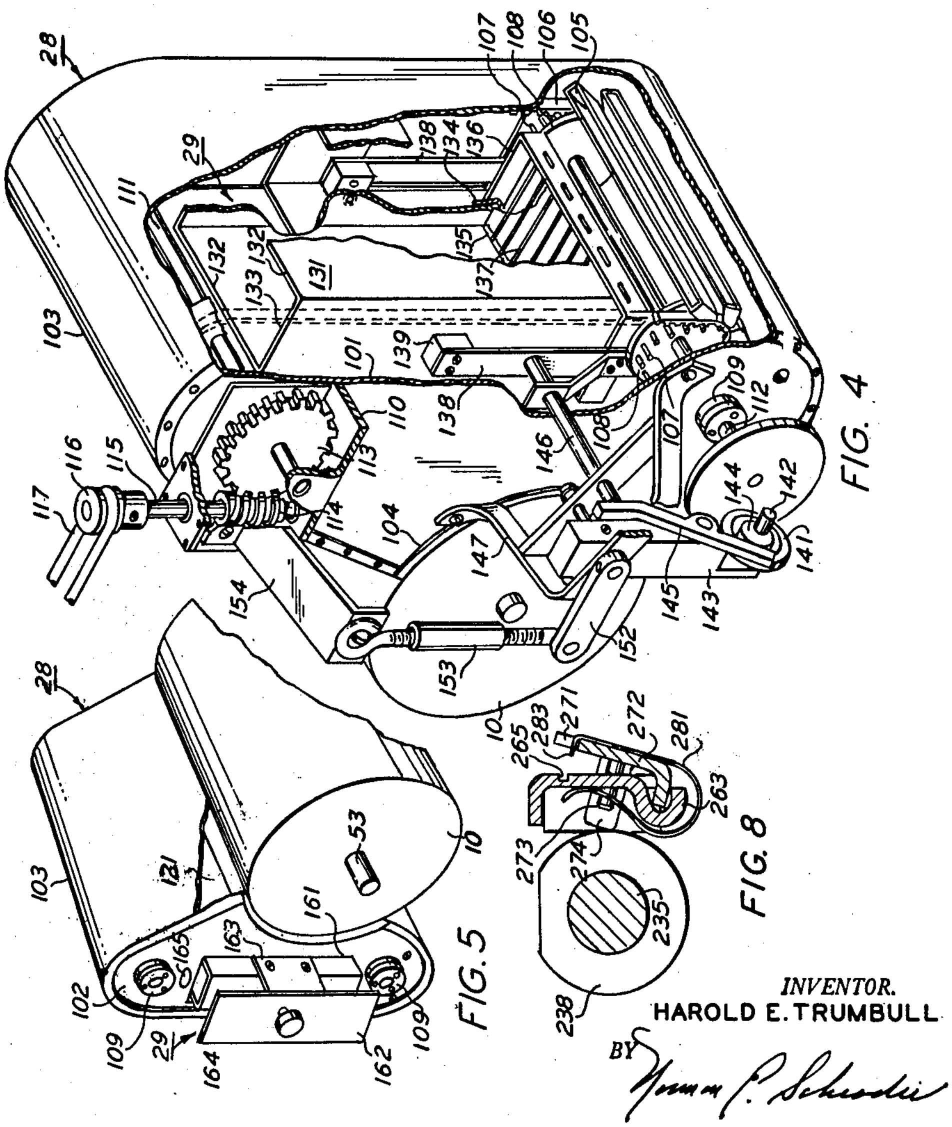
FIG. 4 is a right-hand perspective view of the developer mechanism with parts broken away to show the general arrangement of its structural elements.
FIG. 5 is a left-hand perspective view of the developer mechanism with the toner dispenser partly removed.
FIG. 8 is a sectional view similar to FIG. 7 but with the jaws of the paper gripper opened.

Specifically, the developer assembly, generally designated 28, includes a box-like developer housing having side walls 101 and 102 supporting an outer cover 103 attached thereto, these elements forming in the lower portion thereof a reservoir for developer material. As shown in FIGS. 4 and 5 the side walls are formed with a concave edge portion in conformity with the shape of a xerographic drum to permit the developer housing to be positioned closely adjacent to the xerographic drum, seals 104 being attached to the concave edge portions of the side walls to ride against the peripheral surface of the drum 10.

A suitable bucket-type conveyor is used to convey developer material from the reservoir portion of the developer housing to the upper portion of the developer housing from where it is cascaded over the xerographic drum. In the embodiment disclosed the bucket-type conveyor consists of a series of parallel spaced buckets 105 secured as by rivets to a pair of endless conveyor belts 106 wrapped around the pins 107 of the conveyor drive pulleys 108 secured to drive shaft 111 and driven shaft 112, respectively, to rotate therewith.

The drive shaft 111 of the conveyor is journaled in bearings 109 mounted on the side walls of the developer housing with its left-hand end, as seen in FIG. 4, to which gear 113 is attached extending beyond side wall 101 into gear box 110 fastened to the side wall 101. Gear 113, on the drive shaft is driven by worm 114 fixed on vertical shaft 115 suitably journaled in the gear box 110.

Shaft 115 is connected operatively to motor 62 by belt 117, which runs on pulley 116 and compound pulley 118 fixedly mounted on shaft 115 and on the shaft of motor 62, respectively.

The driven shaft 112 of the conveyor is also journaled in a pair of bearings 109 mounted on the side walls of the developer housing, with the axis of driven shaft 112 positioned in spaced parallel relation to the axis of drive shaft 111. The driven shaft has fixed on one end thereof a circular drive disc 119 which acts as a vertical turntable on which the driven wheel for actuating the toner dispenser rotates as described hereinafter.

To deflect the developing material and to spread this material across the face of the drum as the developing material is emptied out of the conveyor buckets by gravity, there is provided, as seen in FIG. 1, a flanged hopper chute 121 secured to the side walls of the developer housing. As the xerographic drum rotates, developing material tumbled over the flanged hopper chute onto the drum will cascade over the drum and eventually fall off or be thrown off the surface of the xerographic drum to fall into the reservoir portion of the developer housing.

For supporting the developer housing in a position adjacent to the xerographic drum there is secured to the side walls of the developer housing suitable supports 122 which are mounted on the base plate.

As the developing mixture is cascaded over the xerographic drum, toner particles are electrostatically pulled away from the carrier component of the developer material and deposited on the drum to form xerographic powder images, while the partially denuded carrier particles pass off the drum into the reservoir. As toner powder images are formed, additional toner particles must be supplied to the developing mixture in proportion to the amount of toner deposited on the drum. To supply additional toner particles to the developer mixture, a toner dispenser 29 is used to accurately meter toner to the developer mixture.

The toner dispenser consists of a hopper or container 131 for the toner particles to be dispensed. Although the hopper or container may be made in any size or shape, the hopper shown is formed as a rectangular open-ended box having vertical side walls 132 and end walls 133.

The bottom of the hopper is partially closed by dispensing plate or platform 134 positioned in spaced vertical relation below the lower edges of the walls of the hopper. This dispensing plate or platform, which is as wide as the hopper, has upturned end portions by means of which the dispensing plate is suitably attached to the end walls of the hopper. The dispensing plate or platform combines with the walls of the hopper to provide a reservoir having narrow elongated outlet slots or passages 135 for the flow of toner particles.

To effect substantially uniform flow of toner particles through the outlets or passages there is provided a metering element, having a dispensing grid positioned for reciprocating motion in the space between the dispensing plate and the lower edges of the walls of the hopper. The metering element, as shown, consists of an open-ended box 136 having end walls and side walls larger than the walls of the hopper, the dispensing grid being formed on a continuous strand of wire 137 laced from one side wall to the other for the full length of the box.

Spring 138, depending normally in a vertical position from spacers 193 secured to the end walls of the hopper, are attached at their lower ends to the end walls of the metering element to support the latter for substantially reciprocating movement in relation to the toner hopper. Actually, the path of motion of the metering element describes a slight arc, but since the radius of this arc, as determined by the length of each spring working as if pivoted about the line at which it is attached to the spacers, is so large as compared to the length of travel of the metering element, it can be considered that the metering element moves in substantially a straight line.

The rate at which toner is consumed in the development operation depends both on the amount of developer material cascaded onto the drum for development of the electrostatic latent image and on the area of the electrostatic latent image to be developed. The rate at which developer material is cascaded onto the drum, for a given size of developer buckets, depends on the speed of operation of the developer conveyor which is usually fixed at a given rate dependent upon the speed of rotation of the xerographic drum. To correlate the dispensing rate of the toner dispenser with respect to the speed of operation of the developer conveyor, the toner dispenser is driven by a drive transmission of the type wherein rotation is imparted from a drive disc to a driven disc as a consequence of frictional engagement between the periphery of one disc and the face of the other disc and wherein an eccentric linkage is driven by the driven disc to actuate the metering element of the toner dispenser. The position of the driven disc on the drive disc may be varied by an operator to increase or decrease the toner dispensing rate, as required, to compensate for the variations in the electrostatic latent image areas being developed.

The driven disc 141, having a peripheral surface of rubber or like material is rotatably mounted on shaft 142 fixed in the lower end of control lever 143. The driven disc is rotated by frictional contact with drive disc 119 to rotate cam 144. Cam 144 is formed either integrally with the wheel, as shown, or as a separate element attached thereto. Both the driven disc 141 and the cam 144 are retained on shaft 142 by means of a retaining ring 149 positioned in a suitable groove formed in the shaft. Cam follower arm 145, pivotally mounted on the control lever 143, is oscillated upon rotation of the cam 144 to effect a forward stroke of the plunger 146. Plunger 146 is movably mounted in apertures formed in the lower cross member of a frame, 147, fastened to the side wall 101 of the developer housing, and in the guide 148 connected to the left-hand spring 138 as seen in FIG. 4.

One end of the plunger 146 butts against the cam follower arm and its other end butts against the left-hand spring 138 so that the forward stroke of the plunger is effected by movement of the cam follower arm in one direction and the return stroke of the plunger is effected by the biasing action of the springs 138 as the return to their normal vertical position. This biasing action also forces the cam follower portion of the cam follower arm 145 against the cam 144.

A control lever 143 carrying the driven disc 141 rotatably mounted on shaft 142 is fixed on rod 151 journaled in the cross members of the frame 147 to permit the driven disc to be moved edgewise parallel to the face of drive disc 119 to enable the speed of rotation imparted to the driven disc 141 and therefore cam 144 to be changed. Movement of control lever 143 is affected by means of a lever 152 secured at one end to the rod 151 and secured at its opposite end to the lower screw element of the turnbuckle 153 secured to bracket 154 attached to the gear box 110. With this arrangement, the position at which the driven disc contacts the face of the drive disc may be varied while the machine is in operation to increase or decrease the rotational speed of the driven disc with corresponding increase or decrease in the number of strokes per unit of time of the metering element of the toner dispenser.

As shown in FIG. 5, the toner dispenser is movably supported within the developer housing and is inserted therein through an opening 161 formed in the side wall 102. A cover 162 of a size larger than the opening 161 in the side wall is attached by side extension plates 163 formed thereon to the toner dispenser for supporting it within the developer housing. The cover 162, forced against the side wall 102 by fasteners 163 adjustably mounted on the side wall, prevents the toner dispenser from moving axially from within the developer housing. A handle 164 is secured to the cover to permit the toner dispenser to be withdrawn from the developer housing when desired.

*Paper Feed System*

The sheet feeding mechanism for seriatim feeding of cut-sheet support material into transfer contact with the xerographic drum consists of a tray for holding a supply or stack of cut-sheet support material, such as typically paper or the like, separators for separating and advancing a single sheet from the stack to a sheet conveyor mechanism having paper grippers thereon which carry the sheet into contact with the xerographic drum.

A supply of support material to be fed one at a time by the separators is held in a paper tray 31 suitably positioned at the front of the machine. The paper tray is provided with suitable side and end plates to align the stack in the tray as is common in the art. The specific details of the tray are not shown since they form no part of this invention, it being understood that any one of a number of types of papers trays could be used in the apparatus.

To feed sheets of support material one at a time from the paper tray through the guide at the end of the tray, formed in part by the turned-up bottom portion 201 of the tray and by plate 202, for pick-up by a paper gripper 35 of the sheet conveyor, there is provided a paper feeding and separating means or separators 32 comprising arms 203 carrying sheet engaging shoes 204 preferably made of rubber or similar material, which frictionally engage the top sheet of the stack to separate it from the stack and forward it through the guide.

The arms 203 are secured at one end to axle 205 journaled at opposite ends in rockable levers 206 secured to rock shaft 207 journaled in supports 208 and 208a rigidly secured to a frame element of the machine.

The rock shaft 207 has fixed to one end thereof a short lever 211 connected by means of link 212 to one end of actuating lever 213. The actuating lever 213, pivotally secured by a shoulder pin 214 to support 215 fixed on the base plate 51 rotatably carries on its opposite end a cam follower 216 that rides on cam 217 secured to the drum shaft 53, whereby sheet feeding cycle is accomplished in timed relation to the rotation of the xerographic drum and to the sequential feeding of a document.

Return of the separators is effected by means of spring 218 secured at one end to short lever 211 and at its other end is secured to the right-hand frame 60 of the machine. As the separators are returned to their original starting position after a sheet separating stroke they are pulled up out of contact with the stack by means of cam follower 222 riding on cam 223 suitably secured to base plate 52. The cam follower 222 is secured to cam arm 224 fixed to the end of axle 205.

A sheet of support material, such as paper, forwarded by the separator means through the guide at the end of the paper tray is forwarded by an endless conveyor to the xerographic drum adjacent the corona transfer device whereat a xerographic powder image previously formed on the drum is transferred from the drum to the sheet of support material, the sheet then being forwarded by the conveyor to the heat fuser 37 then to delivery rolls which deliver the sheet of support material to the collecting tray.

Figures 6, 12:
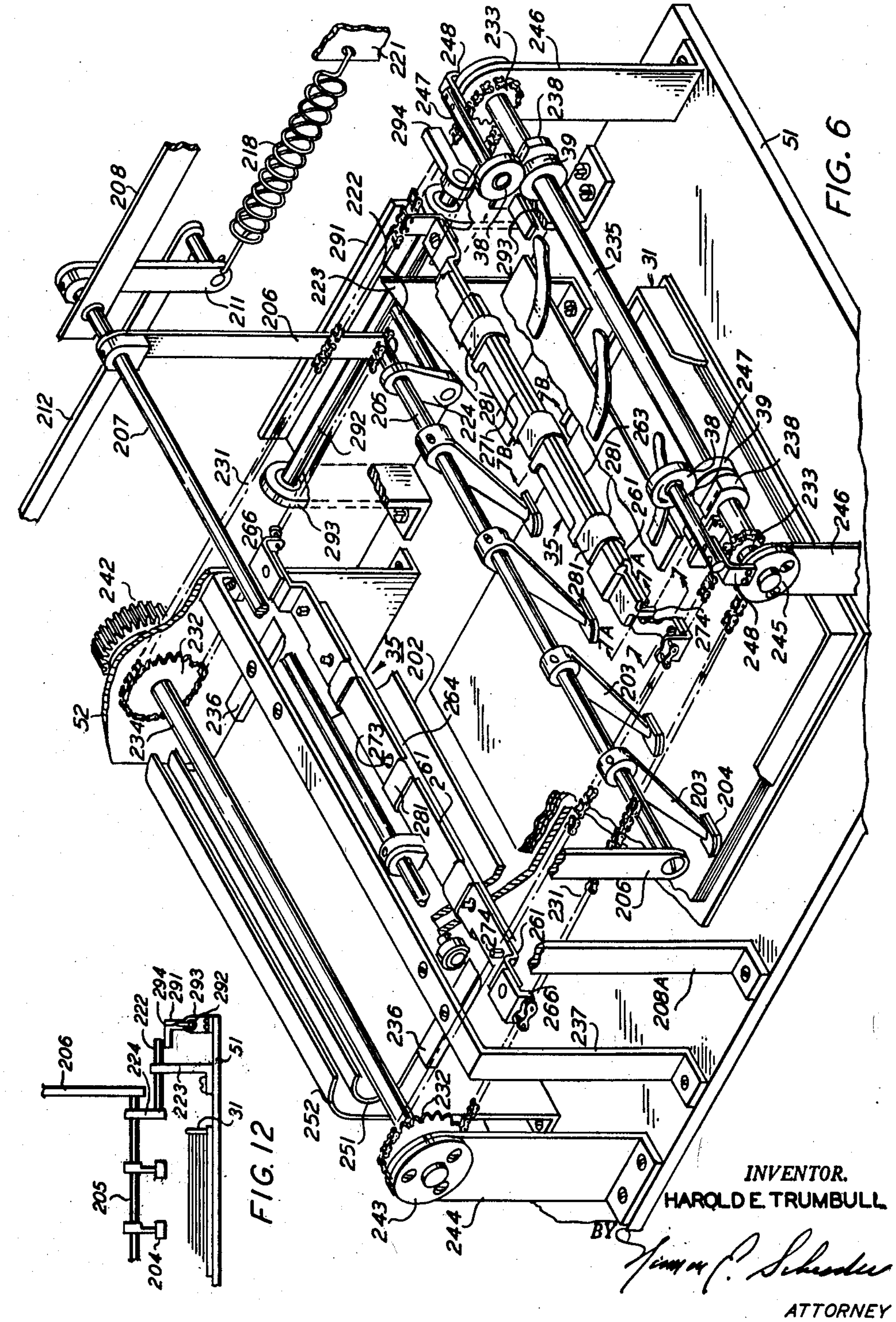
FIG. 6 is a left-hand perspective view of the sheet feeding mechanism of the apparatus.
Figures 9, 10, 11:
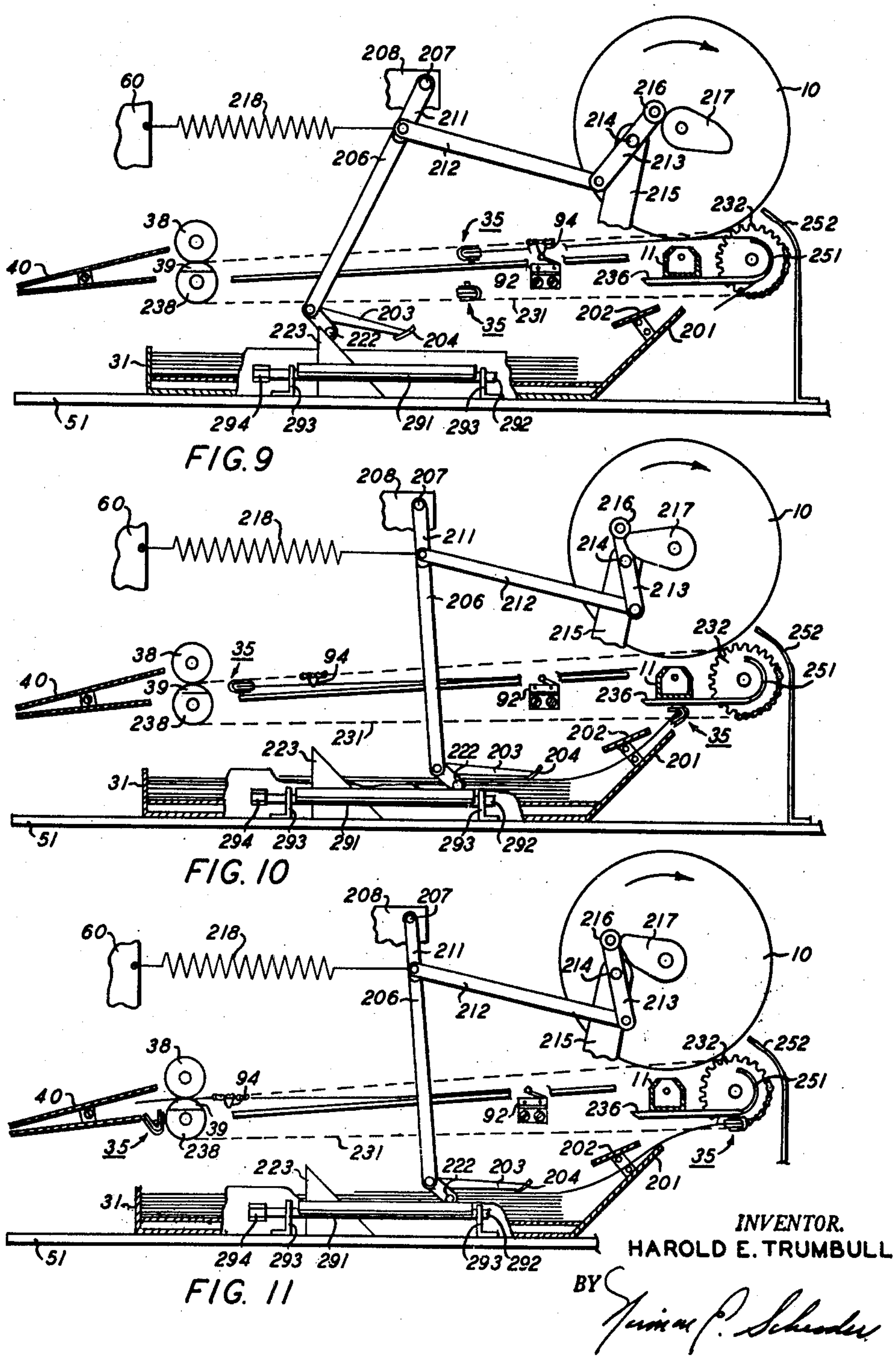
FIGS. 9, 10 and 11 illustrate the sequence of operation of the sheet feed mechanism; and, FIG. 12 is a view of the sheet feed mechanism with the latch in raised position to prevent sheet feeding.

Referring now in particular to FIGS. 1, 2 and 6, the conveyor includes two endless roller chains 231 which pass over sprockets 232 and 233 at the receiving and delivery ends of the conveyor, respectively. The sprockets 232 are secured on shaft 234 while sprockets 233 are secured on shaft 235. All of these last-mentioned sprockets are positioned on their respective shafts to space the chains apart by a distance greater than the length of the drum.

In the embodiment of the conveyor apparatus disclosed, the chains are adapted to carry two paper grippers 35 equally spaced from each other along the length of the chains, the paper grippers being positioned at right angles to the path of travel of the endless roller chains for movement therewith in a closed circuit between sheet receiving and sheet delivery stations. Cams 236 secured to bracket 237 mounted at one end on base plate 52 and at its other end to frame plate 52 are used to cause the paper grippers to open to receive the front or leading edge of a sheet of support material at the receiving station located at the end of the paper tray. The sheet is released from the paper grippers at the delivery station, the paper grippers being actuated at this station by means of D-shape cam discs 238 loosely encircling shaft 235 and fastened to cam brackets 239 suitably secured to a frame element of the machine.

Two paper grippers are used in the preferred embodiment of the machine so that as one paper gripper moves from the receiving station carrying a sheet of support material to the delivery station, the other paper gripper will move from the delivery station to the receiving station to be in position to receive the next sheet of support material fed to it by the separators.

It is apparent then that for each complete operating cycle of the sheet conveyor mechanism the sheet separating and feeding mechanism will have operated through two complete cycles.

The sheet conveyor is operated in timed relation to the drum by means of a gear 241 fixed on the drum shaft 53 meshing with gear 242 fixed at one of the drive shafts 234, the latter being journaled in bearings 243 mounted on bearing support 244 attached to the base plate of the machine and on frame plate 52.

Idler shaft 235, journaled in bearings 245 mounted on bearings supports 246, also carries delivery rolls 39 for rotation therewith, which coact with the delivery rolls 38 to feed a sheet of support material from the machine after it has been released by the paper gripper. The delivery rolls 38 are suitably journaled and retained on axles 247 attached to springs 248 secured to the flanged sides of the bearings 245.

A sheet of transfer material carried by a gripper is guided around the drive shaft 234 by curved guides 251 and 252 secured to bracket 237 and base plate 51, respectively.

Since both of the paper grippers are of like construction, the following description, for simplicity, relates to only one of the paper grippers.

Each paper gripper is so formed as to provide laterally extending hinged jaws that are spring urged to closed position for gripping a sheet of support material during the period of paper transport.

Referring now to FIGS. 6, 7, 7A, 7B and 8; a paper gripper consists of a bar 261 extending transversely between the chains and secured thereto at its ends by means of clips 266 fastened to the chains. The bentdown end portions 262 of the bar connected to the clips 266 are proportioned to position the upper surface of the paper gripper assembly in a plane below the pitch line of the chain. This is required, in the embodiment shown, to permit the paper gripper assembly to travel adjacent to the xerographic drum but out of contact with the peripheral surface of the drum.

The bar 261, the upper surface of which defines a common lower jaw is provided with a laterally extending depending hinge portion 263 along its leading edge, in terms of the direction of travel, which coacts with a depending leading edge portion 272 of an L shaped pivot bar 271 whereby the pivot bar is free to pivot with respect to the lower jaw. The bar 261 is also provided with apertures to movably receive guide pins 273 secured to the underside of the pivot bar 271, the guide pins serving to align the pivot bar on bar 261 and to serve as a stop and guide for the leading edge of a sheet, such as paper, inserted between the pivot bar and the lower jaw.

Individual upper gripper jaws are formed by a plurality of leaf springs 281 each of which has a lower curved end portion 282 pressing against the lower surface of bar 261 and a depending upper end portion or jaw 283 adapted to extend over the trailing edge portion of pivot bar 271 to grip a sheet by forcing the sheet into detents or grooves 265 formed in the upper surface of bar 261. The trailing edge of the pivot bar is notched to align the depending upper end portion or jaw 283 of each leaf spring with the respective detents or grooves 265 with which they cooperate. Intermediate its ends, each spring is provided with a curved portion which encircles the leading edge of the bar 261 and pivot bar 271.

It is to be realized that in the above-described paper gripper mechanism, the pivot bar 271, although acting principally as a lever adapted to pivot on the bar to open the leaf springs, also acts as a secondary upper gripper jaw with its trailing bottom portion biased into gripping engagement with the upper jaw portion of the bar 261 by means of the leaf springs.

The detents or grooves 265 formed in the upper surface of bar 261, are so designed that the bottom surface of the groove or detent is only slightly below the upper surface of the bar 261, so that the sheet is not cut as it is forced into the detents by the depending upper end portion or jaw of the leaf springs.

The upper jaw is provided with depending end lugs 274 that extend through suitably opening 264 in the lower jaw to act as actuators for the paper gripper. The lugs as they strike either cams 236, or cams 238, force the movable pivot bar and the jaw 283 of spring 281 away from the lower jaw 261 to permit a sheet to be inserted into or removed from the paper gripper.

It is apparent that the terms upper and lower are used merely as an aid in describing the paper gripper in terms of the gripper shown in the right-hand side of FIG. 6 and that they therefore should not be considered as a limitation in any respect.

*Fuser*

The developing materials used for forming the powder images are specifically designed to permit them to be fixed to the support material either by heat fixing or vapor fixing techniques, that is, the individual particles or resin (toner) soften and coalesce when heated or plasticized by solvent, so that they become sticky and readily adhere to the support material. Thus, although any suitable fusing device may be used, in the embodiment shown, a heat fuser 37 of the type disclosed in copending Eichler application, Serial No. 797,143, filed March 4, 1959, now Patent No. 2,965,868, is used to supply heat by means of resistance elements for fusing the powder images.

*Plate Cleaning*

The cylindrical brush 41 used to remove residual powder from the drum is mounted on shaft 42 journaled in dust hood 43 is operatively connected to motor 62 by belt 82, which runs on pulley 83 and pulley 117, which is a double or compound pulley, fixedly mounted on shaft 42 and the shaft of motor 62, respectively.

The reproducing cycle is started after the original has been inserted in the machine by depressing a locking push button switch 91, mounted on the cover of the machine, which along with a limit switch 92 wired in parallel (not shown) connects the motor 62 to a source of electrical power.

Limit switch 92, a normally closed switch, is secured on a switch bracket 93 adjacent the chain conveyor to be actuated by a cam 94 connected to a chain 231. The limit switch 92 acts as a machine shut down switch, that is the machine operation is discontinued when the cam 94 actuates the limit switch to open its contact thus stopping the machine with the cam 94 in contact with limit switch 92.

In starting the machine, the operator depresses the switch 91 for a sufficient length of time to permit the chain conveyor to move sufficiently to transport the cam 94 out of contact with the limit switch 92 whereby the contacts of this switch are closed at which time the switch 91 can be released.

The operating cycle of the apparatus, as shown, is such that it requires two cycles of rotation of the xerographic drum to effect one cycle of rotation of the sheet conveyor mechanism. Thus assuming that a single reproduction is to be made, the original will be ejected from the machine and an image will be reproduced on the drum and transfer will be effected during the first cycle of rotation of the drum. However, at this point in the operation of the apparatus, the sheet of support material previously transported to the drum for transfer of the powder image from the drum to the support material is still within the machine and must be ejected. Thus after the first cycle of rotation of the drum, even though a second reproduction is not made, the xerographic drum must rotate through a second revolution to permit the sheet conveyor to eject the sheet of support material carrying the transferred image from the machine.

During the second revolution of the drum, still assuming that only a single reproduction is being made, the optical system will in effect scan the empty gate 16, to expose the xerographic drum. The xerographic drum will again rotate through the developing station and the transfer station as previously described, however, the latch 291, as seen in FIG. 6, will now have been lifted by the operator to engage the cam follower 222 to prevent the separators 32 from dropping onto the stack of support material to thereby prevent the advancement of a sheet of transfer material from the paper tray to the xerographic drum.

As the xerographic drum continues to rotate through the second cycle it will again be cleaner as it passes through the cleaning station and thus made ready for an actual reproducing cycle.

As shown, the latch 291 is secured to shaft 292 suitably journaled in supports 293 secured to base plate 51, and provided with a lever 294 by means of which the operator can move the latch into contact with cam follower 222 or out of contact with the cam follower as desired.

As the sheet conveyor completes one cycle of rotation the cam 94 will actuate the limit switch 92 to open its contact to thereby de-energize the drive motor 62.

In making successive reproductions or multiple reproductions, a xerographic reproduction is effected for each revolution of the drum except for the last reproduction to be made, at which time the machine effects one complete operating cycle as described hereinabove for a single reproduction. To prevent the machine from being de-energized during the above operating sequence by actuation of limit switch 92 by cam 94, the operator must lock the locking push button switch 91 into position with its contacts closed until the machine is in its last reproducing cycle at which time the switch 91 is released to enable the machine to be de-energized by limit switch 92.

While the invention has been described with reference to the structures disclosed herein, it is not confined to the details set forth and this application is intended to cover such modifications or changes as may come within the purposes of the improvements or the scope of the following claims.

What is claimed is:

1. In a xerographic apparatus, the combination of a xerographic drum journaled for rotation, charging means positioned to place a uniform electrostatic charge on said xerographic drum, a document conveyor positioned to feed a document to be reproduced, said document conveyor including a driven feed roller, an idler roller pivotally mounted adjacent said driven feed roller for movement from a first position in which said idler roller is out of cooperative relation to said driven feed roller to a second position in which said idler roller is in cooperative document advancing relation to said driven feed roller, and biasing means connected to said idler roller for normally biasing said idler roller into said second position; a lens positioned intermediate said document conveyor and said xerographic drum to project a light image from a moving document fed by said document conveyor onto said xerographic drum to form an electrostatic latent image thereon, developer means positioned adjacent said xerographic drum to develop said latent electrostatic image on said drum, a tray to support a stack of paper, a sheet conveyor having at least one paper gripper positioned adjacent said xerographic drum and between said tray and said xerographic drum, paper feed and separator means positioned to successively feed single sheets of paper to said paper gripper on said sheet conveyor, transfer means positioned adjacent said xerographic drum to effect transfer of a developed image from said xerographic drum onto a sheet of paper carried by said sheet conveyor, drive means connected to said xerographic drum, said document conveyor and said sheet conveyor to move said xerographic drum, said document conveyor and said sheet conveyor at predetermined speeds relative to each other, and means connected to said xerographic drum to move said idler roller from said first position to said second position and to actuate said paper feed and separator means to advance a sheet of paper to said sheet conveyor in timed relation to the movement of said idler roller from said first position to said second position.

2. In a xerographic apparatus, the combination of a xerographic drum journaled for rotation, charging means positioned to place a uniform electrostatic charge on said xerographic drum, a document conveyor positioned to feed a document to be reproduced, said document conveyor including a driven feed roller, an idler roller pivotally mounted adjacent said driven feed roller for movement from a first position out of cooperative relation with said driven feed roller to a second position in cooperative relation with said driven feed roller to advance a document, and biasing means connected to said idler roller for normally biasing said idler roller into said second position; a lens positioned intermediate said document conveyor and said xerographic drum to project a light image from a moving document fed by said document conveyor onto said xerographic drum to form an electrostatic latent image thereon, developer means positioned adjacent said xerographic drum to develop a latent electrostatic image on said xerographic drum, a tray to support a stack of paper, a sheet conveyor positioned adjacent said xerographic drum and between said tray and said xerographic drum, paper feed and separator means positioned to successively feed single sheets of paper to said sheet conveyor, transfer means positioned adjacent said xerographic drum to effect transfer of a developed image from said xerographic drum onto a sheet of paper carried by said sheet conveyor, drive means connected to said xerographic drum, said document conveyor and said sheet conveyor to move said xerographic drum, said document conveyor and said sheet conveyor at predetermined speeds relative to each other, and means connected to said xerographic drum to move said idler roller from said first position to said second position and to actuate said paper feed and separator means to advance a sheet of paper to said sheet conveyor in timed relation to the movement of said idler roller from said first position to said second position.

3. In a xerographic apparatus, the combination of a xerographic drum journaled for rotation, charging means positioned to place a uniform electrostatic charge on said xerographic drum, a document conveyor positioned to feed a document to be reproduced, said document including a driven feed roller, and an idler roller pivotally mounted adjacent said driven feed roller for movement from a first position out of cooperative relation with said driven feed roller to a second position in cooperative document feeding relation with said driven feed roller, and biasing means connected to said idler roller for normally biasing said idler roller into said first position; a lens positioned intermediate said document conveyor and said xerographic drum to project a light image from a moving document fed by said document conveyor onto said xerographic drum to form an electrostatic latent image thereon, developer means positioned adjacent said xerographic drum to develop said latent electrostatic image on said drum, a tray to support a stack of paper, a sheet conveyor positioned adjacent said xerographic drum and between said tray and said xerographic drum, paper feed and separator means positioned to successively feed single sheets of paper to said sheet conveyor, transfer means positioned adjacent to said xerographic drum to effect transfer of a developed image from said xerographic drum onto a sheet of paper carried by said sheet conveyor, drive means connected to said xerographic drum, said document conveyor and said sheet conveyor to move said xerographic drum, said document conveyor and said sheet conveyor at predetermined speeds relative to each other, means connected to said xerographic drum to move said idler roller from said first position to said second position and to actuate said paper feed and separator means once during each revolution of said drum, and means positioned adjacent said paper feed and separator means adapted to dis-engage said paper feed and separator means.

References Cited in the file of this patent

UNITED STATES PATENTS

| | | |
|---|---|---|
| 2,889,758 | Bolton | June 9, 1959 |
| 2,918,853 | Oldenboom | Dec. 29, 1959 |